(12) United States Patent
Carr et al.

(10) Patent No.: US 9,189,304 B2
(45) Date of Patent: Nov. 17, 2015

(54) SYSTEM AND METHOD FOR PROVIDING A DYNAMIC INVOCATION AND SERVICE INTERFACE FOR USE IN A MIDDLEWARE OR OTHER ENVIRONMENT

(75) Inventors: Harold Carr, Salt Lake City, UT (US); Ryan Eberhard, Honesdale, PA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 830 days.

(21) Appl. No.: 13/427,574

(22) Filed: Mar. 22, 2012

(65) Prior Publication Data

US 2013/0066946 A1    Mar. 14, 2013

Related U.S. Application Data

(60) Provisional application No. 61/533,068, filed on Sep. 9, 2011.

(51) Int. Cl.
    *G06F 15/16*    (2006.01)
    *G06F 9/54*     (2006.01)
    *G06F 9/46*     (2006.01)

(52) U.S. Cl.
    CPC .............. *G06F 9/546* (2013.01); *G06F 9/547* (2013.01); *G06F 9/465* (2013.01)

(58) Field of Classification Search
    None
    See application file for complete search history.

(56) References Cited

U.S. PATENT DOCUMENTS

| | | | |
|---|---|---|---|
| 2003/0084097 A1* | 5/2003 | Messinger et al. | 709/203 |
| 2004/0078486 A1* | 4/2004 | Salahshoor et al. | 709/245 |
| 2005/0198100 A1* | 9/2005 | Goring et al. | 709/200 |
| 2005/0240654 A1* | 10/2005 | Wolber et al. | 709/206 |
| 2005/0240663 A1* | 10/2005 | Wolber et al. | 709/220 |
| 2006/0190580 A1 | 8/2006 | Shu et al. | |
| 2008/0228851 A1* | 9/2008 | Angelov et al. | 709/201 |
| 2010/0125624 A1* | 5/2010 | Bachhuber-Haller et al. | 709/202 |

OTHER PUBLICATIONS

International Search Report dated Jan. 2, 2013 for International Application No. PCT/US2012/054131 filed Sep. 7, 2012.
Wilkes et al., Service-Oriented Architecture: Considerations for Agile Systems, http://msdn.microsoft.com/en-us/library/aa480028.aspx, pp. 1-14, Apr. 1, 2004.
Endrei, M. et al., Patterns: Service-Oriented Architecture and Web Services—First Edition, IBM Redbooks, http://www.redbooks.ibm.com/redbooks/pdfs/sg246303.pdf, pp. 1-370, Apr. 1, 2004.
International Searching Authority, International Search Report and Written Opinion for PCT International Application PCT/US2012/054131, Jan. 2, 2013, 11 pages.

* cited by examiner

*Primary Examiner* — Hamza Algibhah
*Assistant Examiner* — James Edwards
(74) *Attorney, Agent, or Firm* — Tucker Ellis LLP

(57) ABSTRACT

A system and method for providing a dynamic invocation and service interface for use in a middleware or other environment. At the service-side, messages can be inserted into an inbound processing chain. After service-side inbound processing, messages are given to the user via a provider request function. The user gives a response by using a provider response function that inserts messages into a service-side outbound processing chain. After service-side outbound processing, messages are given to the user's service response transport. On the client side, the user can insert messages into the outbound processing chain using a dispatcher request. After client-side outbound processing, messages are given to the user's client request transport. This decouples message processing from the transport and makes the message processing asynchronous in nature. When the response is received, a user uses a client response transport function to insert the response into the client-side inbound processing chain.

15 Claims, 5 Drawing Sheets

SYSTEM AND METHOD FOR PROVIDING A DYNAMIC INVOCATION AND SERVICE INTERFACE FOR USE IN A MIDDLEWARE OR OTHER ENVIRONMENT

CLAIM OF PRIORITY

This application claims the benefit of priority to U.S. Provisional Patent Application No. 61/533,068, titled "SYSTEM AND METHOD FOR PROVIDING A DYNAMIC INVOCATION AND SERVICE INTERFACE FOR USE IN A MIDDLEWARE OR OTHER ENVIRONMENT", filed Sep. 9, 2011, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems and software such as middleware, and is particularly related to systems and methods for providing a dynamic invocation and service interface (DISI) for use in a middleware or other environment.

BACKGROUND

Generally, a web service is a software system that supports machine-to-machine interaction over a network. A web service protocol stack is a stack of networking and other protocols that can be used to define, locate, implement, and enable services to interact with one other. Examples of such protocols include the Simple Object Access Protocol (SOAP), which specifies the exchange of structured information for use with web services, and which relies on Extensible Markup Language (XML) for a message format, and on other protocols (e.g., Hypertext Transfer Protocol (HTTP) or Simple Mail Transfer Protocol (SMTP)) for message transmission. Commonly, each web service has an interface described in a machine-understandable format, such as the Web Services Description Language (WSDL). Other systems can use SOAP messages to interact with the web service interface in a manner prescribed by its description.

Other types of protocol stacks can similarly include some processing of message information, wherein the messages are themselves encoded in some fashion, e.g., the Common Object Request Broker Architecture (CORBA) stack.

In the context of message remoting stacks, such as SOAP or CORBA stacks, which allow computers to communicate at a relatively high-level, there are benefits in being able to treat messages as a unit, i.e., taking a message and processing it including any necessary decoding, and providing a result. The Java API for XML Web Services (JAX-WS) specification, which is provided as part of the Java EE platform for use in creating web services, includes some aspects of client and service side dynamic message processing. However, the JAX-WS specification does not provide a means of allowing dynamic message processing at the transport-level of the client and service sides, nor of asynchronous handling of messages at the service-side provider level. These are the general areas that embodiments of the invention are intended to address.

SUMMARY

Disclosed herein is a system and method for providing a dynamic invocation and service interface (DISI) for use in a middleware or other environment. In accordance with an embodiment, the system and/or method operates both at the client-side, and at the service-side. At the service-side, the user can insert messages into the inbound processing chain using a service request transport. After service-side inbound processing, messages are given to the user via a provider request function. The user gives a response by using a provider response function that inserts messages into the service-side outbound processing chain. After service-side outbound processing, messages are given to the user's service response transport. The service request transport and service response transport decouples the messaging processing from the transport and makes the message processing asynchronous in nature. The provider request and provider response are also asynchronous in nature. On the client side, the user can insert messages into the outbound processing chain using a dispatcher request. After client-side outbound processing, messages are given to the user's client request transport. This decouples message processing from the transport and makes the message processing asynchronous in nature. When the response is received, a user uses a client response transport function to insert the response into the client-side inbound processing chain. After client-side inbound processing, message are given to the user's dispatcher response function. The dispatcher request and dispatcher response are also asynchronous in nature. On both the client and service-sides, since DISI is asynchronous, threads are not backed up, i.e., a client can send a request and not have to wait for a response. The process also allows decoupling of, e.g., SOAP processing, from the message transport, and makes it asynchronous in nature.

DETAILED DESCRIPTION

Figure 1:
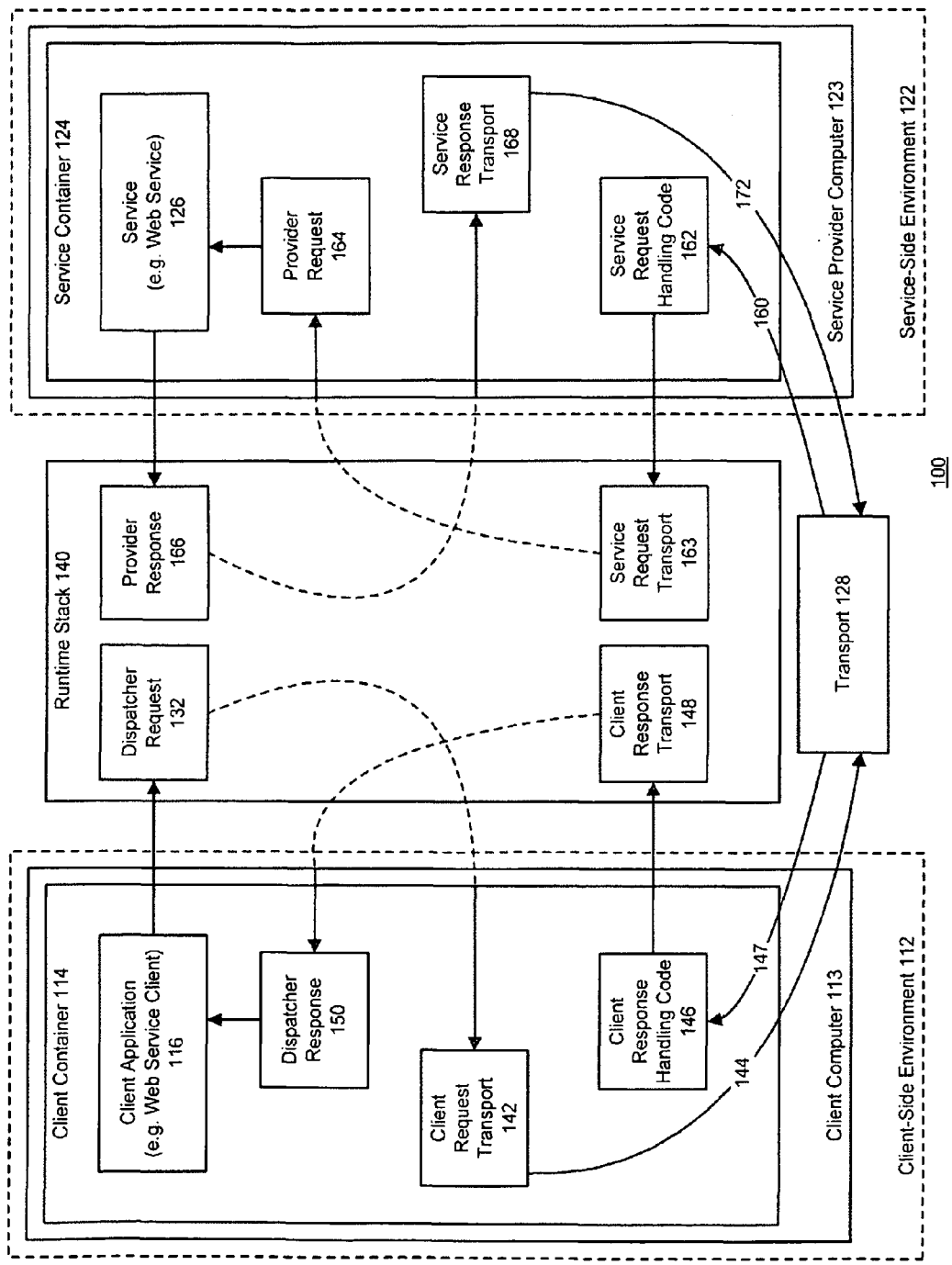
FIG. 1 illustrates a system that can utilize a dynamic invocation and service interface (DISI), in accordance with an embodiment.

As described above, a web service is a software system that supports machine-to-machine interaction over a network. A web service protocol stack is a stack of networking and other protocols that can be used to define, locate, implement, and enable services to interact with one other. Examples of such protocols include the Simple Object Access Protocol (SOAP), which specifies the exchange of structured information for use with web services, and which relies on Extensible Markup Language (XML) for a message format, and on other protocols (e.g., Hypertext Transfer Protocol (HTTP) or Simple Mail Transfer Protocol (SMTP)) for message transmission. Commonly, each web service has an interface described in a machine-understandable format, such as the Web Services Description Language (WSDL). Other systems can use SOAP messages to interact with the web service interface in a manner prescribed by its description.

Other types of protocol stacks can similarly include some processing of message information, wherein the messages are themselves encoded in some fashion, e.g., the Common Object Request Broker Architecture (CORBA) stack.

In the context of message remoting stacks, such as SOAP or CORBA stacks, which allow computers to communicate at a relatively high-level, there are benefits in being able to treat messages as a unit, i.e., taking a message and processing it including any necessary decoding, and providing a result. The Java API for XML Web Services (JAX-WS) specification, which is provided as part of the Java EE platform for use in creating web services, includes some aspects of client and service side dynamic message processing. However, the JAX-WS specification does not provide a means of allowing dynamic message processing at the transport-level of the client and service sides, nor of asynchronous handling of messages at the service-side provider level.

In accordance with an embodiment, disclosed herein is a system and method for providing a dynamic invocation and service interface (DISI) for use in a middleware or other environment. The system and/or method operates both at the client-side, and at the service-side.

At the service-side, messages can be inserted using a service request transport and a service response transport, which decouples the messaging processing from the transport, and makes the message processing asynchronous in nature. At the service-side, the user can insert messages into the inbound processing chain using a service request transport. After service-side inbound processing, messages are given to the user via a provider request function. The user gives a response by using a provider response function that inserts messages into the service-side outbound processing chain. After service-side outbound processing, messages are given to the user's service response transport. The service request transport and service response transport decouples the messaging processing from the transport and makes the message processing asynchronous in nature. The provider request and provider response are also asynchronous in nature. (JAX-WS does have a provider, but it is not asynchronous; JAX-WS does not have equivalents to service request transport and service response transport).

At the client-side, a dispatcher request function is provided which puts messages at the beginning of the outbound processing chain, and a dispatcher response function is provided that receives messages at the end of the inbound processing chain. Since the process is asynchronous, threads are not backed up, i.e., a client can send a request and not have to wait for a response. The process also allows decoupling of, e.g., SOAP processing, from the message transport, and makes it asynchronous in nature. At the client-side, a dispatcher request function inserts message into the client-side outbound processing chain. On the client side, the user can insert messages into the outbound processing chain using a dispatcher request. After client-side outbound processing, messages are given to the user's client request transport. This decouples message processing from the transport and makes the message processing asynchronous in nature. When the response is received, a user uses a client response transport function to insert the response into the client-side inbound processing chain. After client-side inbound processing, message are given to the user's dispatcher response function. The dispatcher request and dispatcher response are also asynchronous in nature. (JAX-WS does have a dispatch function that does have asynchronous capabilities; JAX-WS does not have equivalents to client request transport and client response transport). On both the client and service-sides, since DISI is asynchronous, threads are not backed up, i.e., a client can send a request and not have to wait for a response. The process also allows decoupling of, e.g., SOAP processing, from the message transport, and makes it asynchronous in nature.

In accordance with an embodiment, a DISI interface can be modeled after standard JAX-WS client and service endpoint interfaces, but can also include those differences necessary to satisfy the requirements of containing environments or products, such as Oracle Service Bus (OSB), particularly in the areas of asynchrony and transport-neutrality requirements. For example, while JAX-WS includes a client-side asynchronous programming model, there is no model for asynchronous services. Therefore, in accordance with an embodiment, DISI can define its own asynchronous client-side programming model so that the client, service endpoint, and transport-level interfaces are consistent.

In accordance with an embodiment, the DISI interface can be used to formalize the contract between different environments or products, such as Oracle WebLogic, JRF Web Services and OSB, in regard to, e.g., how OSB should integrate web services, including configuration, manageability, databinding, and general runtime. Some benefits of the DISI interface include that it allows the dynamic and spontaneous initialization of a service endpoint without requiring an explicit JavaEE or JRF style deployment; it allows the caller (i.e., containing product) to fully control inbound and outbound transports through hook points; it allows the caller (i.e., containing product) to fully control service or client configuration through WebServiceFeature instances and to explicitly not require deployment descriptors; and it can be fully asynchronous and allow request and response processing for any particular request to be executed by different threads.

FIG. 1 illustrates a system 100 that can utilize a dynamic invocation and service interface (DISI), in accordance with an embodiment.

As shown in FIG. 1, a client-side environment 112 which includes a client computer 113, a client container 114, and a client application 116 (e.g., a web services client) communicates via a transport 128 with a service-side environment 122 which includes a service provider computer 123, a service container 124 (e.g., a web services container), and a service 126 (e.g., a web service).

At the client-side, the client application initiates an outbound call by invoking DispatcherRequest 132 (also giving a DispatcherResponse instance that will be invoked by the stack when/if a response is returned). The runtime stack 140 performs outbound SOAP processing (e.g., WS-Addressing, MTOM, character encoding, WS-ReliableMessaging, WS-Security, etc.). When outbound SOAP processing is complete, the runtime stack calls ClientRequestTransport 142 with the message to be sent (and a ClientResponseTransport instance to invoke when a response is returned). The client is then responsible for sending 144 the message on a transport (e.g., shared-memory, JMS, FTP, etc.). The client is also responsible to set up client response handling code 146 that will receive responses (e.g., JMS queue, socket listener). When a response comes back 147 on the transport, the client code calls ClientResponseTransport 148 with the message. The runtime stack performs inbound SOAP processing. When inbound SOAP processing is complete, the runtime stack calls DispatcherResponse 150 with the response, which is then given to the client application.

The service-side is similar to the client-side. The service-side is responsible to set up service request handling code 162 that will receive requests from the transport 128. When a message arrives on the transport 160 it is handled by the service request handling code 162 that calls ServiceRequestTransport 163 with the message (also giving two ServiceResponseTransports instances that will be invoked when/if a response is to be returned). The runtime stack 140 performs inbound SOAP processing. When inbound SOAP processing is complete, the runtime stack calls provider request 164 with the message for the service 126 (and a provider response instance to invoke to return a response). The service 126 communicates the response by invoking provider response 166 with the message (the message means both the data of the invocation and any metadata needed for processing, e.g., mime-type). The runtime stack 140 performs outbound SOAP processing. When outbound SOAP processing is complete the runtime stack calls service response transport 168 which is responsible for placing the response on the transport 172. Also, as shown in FIG. 1, when a box (i.e., object) is shown inside the client, runtime, or service containers, this indicates that it is the responsibility of that container to create the object).

Client-Side Invocation Flow

Figure 2:
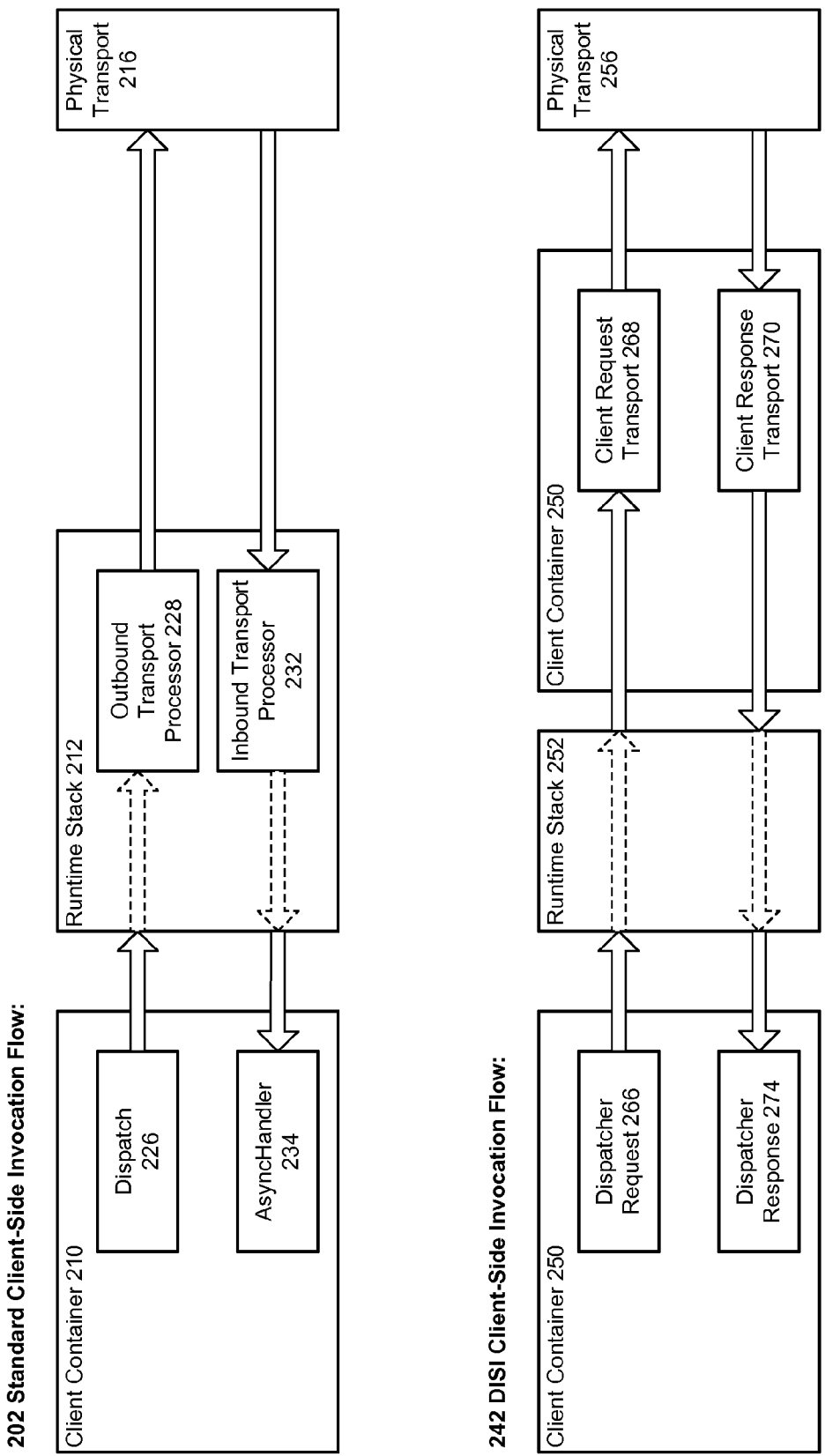
FIG. 2 illustrates a standard and a DISI client-side invocation flow, in accordance with an embodiment.

FIG. 2 illustrates a standard client-side invocation flow 202, and a DISI client-side invocation flow 242, between containing environments 210, 250, runtime stacks 212, 252, and physical transports 216, 256 respectively, in accordance with an embodiment.

In the standard model, which uses an outbound transport processor 228 and inbound transport processor 232, the transport handling code and physical transport are mostly opaque. In contrast, in the DISI model the transport handling code and physical transport are available/visible to the client. (As shown in FIG. 2, when a box (i.e., object) is shown inside a container, this indicates that the object is visible to the container). As such, while in the standard model only Dispatch 226 and AsyncHandler 234 are visible to the client container; in the DISI model both the client request handling (i.e., ClientRequest and ResponseTransport) and the physical transport is visible/available.

As shown in FIG. 2, the standard client-side invocation flow 202 begins with a Dispatch instance, carries through the web services runtime, and terminates on a transport. Dispatch provides an easy-to-use asynchronous programming model. FIG. 2 illustrates one variant of the model, where the caller provides an AsyncHandler to receive the response:

Dispatch→ . . . runtime stack . . . → . . . transport
AsyncHandler← . . . runtime stack . . . ←transport In the above illustration, Dispatch is called by the containing environment, while AsyncHandler is implemented by the containing environment. With the above approach, there is no standard way for an application to override or control the transport implementation other than using very low-level socket or URL connection factory configurations. Dispatch provides no standard support for persistence or clustering, and AsyncHandlers are not required to be serializable.

In accordance with an embodiment, the DISI client-side invocation flow defines DispatcherRequest 266 and DispatcherResponse 274, which take the place of Dispatch and AsyncHandler respectively; and ClientRequestTransport 268 and ClientResponseTransport 270, which take the place of the outbound (request) and inbound (response) transport:

DispatcherRequest→ . . . runtime stack . . . → . . . ClientRequestTransport
DispatcherResponse← . . . runtime stack . . . ←ClientResponseTransport In the above illustration, DispatcherRequest and ClientResponseTransport are called by the containing environment, while DispatcherResponse and ClientRequestTransport are implemented by the containing environment.

In accordance with an embodiment, the containing environment (e.g., OSB) can issue requests by invoking on an instance of DispatcherRequest. This request will terminate in a call to an instance of ClientRequestTransport. The ClientRequestTransport instance is responsible for interacting with the physical transport. When a response is received by the physical transport, the containing environment will invoke response processing on an instance of ClientResponseTransport. The response processing will flow through the runtime stack and the response processing will terminate with a call to an instance of DispatcherResponse.

An example implementation that uses Oracle WebLogic, Oracle Web Services, and Oracle Service Bus may include the configuration shown below. Other environments and implementations which utilize different products may use different configurations:

DispatcherRequest: implemented by Web Services.
ClientRequestTransport: implemented by the containing environment (e.g., OSB).
ClientResponseTransport: implemented by Web Services and passed to the ClientRequestTransport at the time an outbound call is made.
DispatcherResponse: implemented by the containing environment and passed to the DispatcherRequest at the time the original request was made.

In accordance with an embodiment, clients may mix-and-match use of DispatcherRequest/DispatcherResponse with use of ClientRequestTransport/ClientResponseTransport and use of standard patterns. That is, clients may use standard Dispatch (synchronous, polling, AsyncHandler) with ClientRequestTransport/ClientResponseTransport. Clients may also use DispatcherRequest/DispatcherResponse with the built-in transports.

Client Life-Cycle

In accordance with an embodiment, DISI provides a service class that acts as a factory for DispatcherRequest instances. The containing environment (e.g., OSB) passes their implementation of ClientRequestTransport using the feature, ClientTransportFeature, at either Service or Dispatch/DispatcherRequest initialization.

```
// Initialize instance of customer-implemented ClientRequestTransport
ClientRequestTransport clientRequestTransport = new
OSBClientRequestTransport( );
// Create DispatcherRequest
ClientTransportFeature ctf = new
ClientTransportFeature(clientRequestTransport);
Service s = ServiceFactory.factory( ).create(..., ctf);
DispatcherRequest dispatcherRequest = s.createDispatch(...);
// Making a call
DispatcherResponse callback = new MyDispatcherResponse( );
dispatcherRequest.request(..., callback);
```

Once the caller invokes DispatcherRequest.request( . . . ), request processing commences, and concludes with either an error or a call to the ClientRequestTransport. The ClientRequestTransport receives an instance of ClientResponseTransport to invoke on when the exchange is done. When the application code invokes the ClientResponseTransport instance, then response processing has begun and this flow terminates in a call to the DispatcherResponse instance.

Service-Side Invocation Flow

Figure 3:
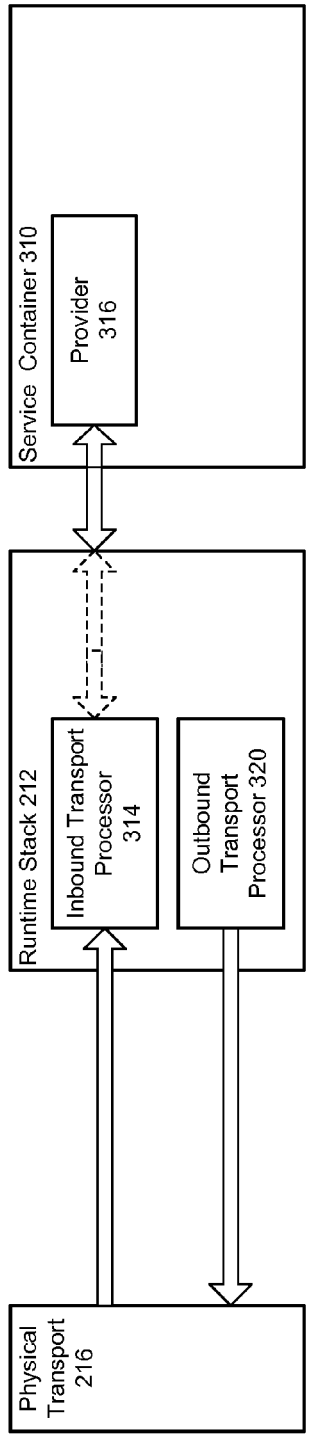
FIG. 3 illustrates a standard and a DISI service-side invocation flow, in accordance with an embodiment.
Figure 3:
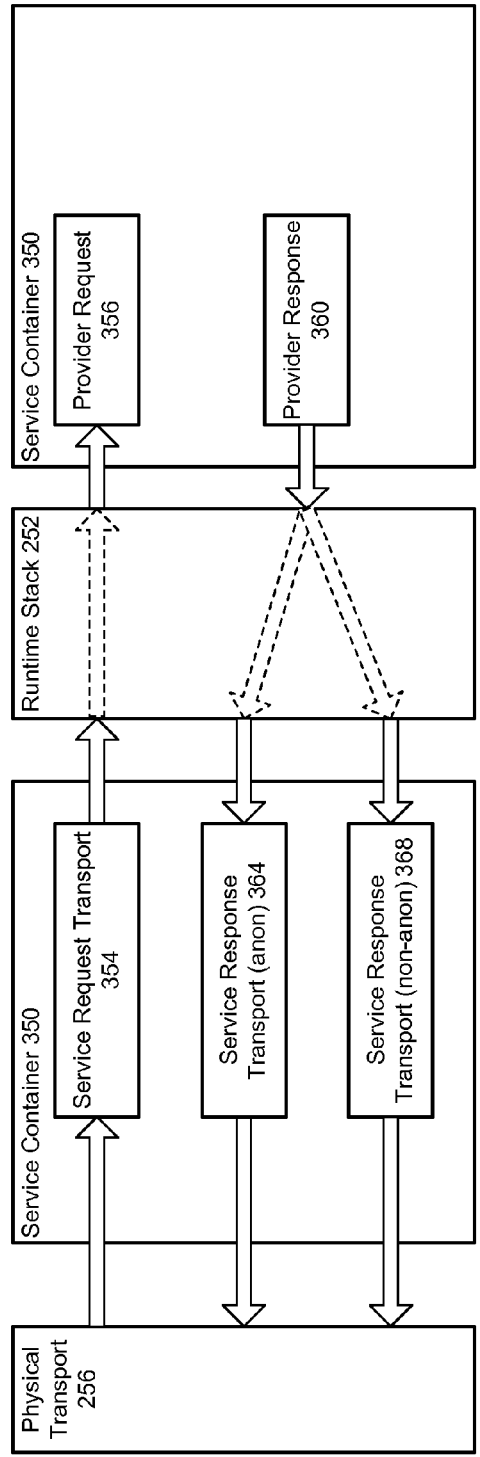

FIG. 3 illustrates a standard service-side invocation flow 302, and a DISI service-side invocation flow 342 between service-side containers 310, 350, runtime stacks 212, 252, and physical transports 216, 256 respectively, in accordance with an embodiment.

As shown in FIG. 3, the standard service-side invocation flow 302 begins with the transport, carries through the web services runtime via inbound transport processor 314 and outbound transport processor 320, and terminates on a Provider instance (or SEI) 316, which then returns. There is no standard asynchronous service-side programming model, although the JAX-WS Reference Implementation does provide an AsyncProvider:

transport→ . . . runtime stack . . . →Provider
transport← . . . runtime stack . . . ←Provider (returns)

In the above illustration, Provider and Provider (returns) are implemented by the containing environment. As with the client-side, there is no standard way for an application to override or control the transport implementation other than using very low-level or application-server specific integrations. The Provider model provides no standard support for persistence or clustering, and Providers are not required to be Serializable, and the standard Provider model is not asynchronous.

In accordance with an embodiment, the DISI service-side invocation flow 342 defines ServiceRequestTransport 354 and ServiceResponseTransport 364, 368, which take the place of the inbound and response transport; and ProviderRequest 356 and ProviderResponse 360, which take the place of the Provider.

ServiceRequestTransport→ . . . runtime stack . . . → . . . ProviderRequest
ServiceResponseTransport (anon)← . . . runtime stack . . . ←ProviderResponse
ServiceResponseTransport (non-anon)← . . . or . . .

In the above illustration, ServiceRequestTransport and ProviderResponse are called by the containing environment, and ServiceResponseTransport (anon), ServiceResponseTransport (non-anon) and ProviderRequest are implemented by the containing environment.

In accordance with an embodiment, the containing environment (e.g., OSB) can issue requests by invoking on an instance of ServiceRequestTransport. This request will terminate in a call to a Java Web Service (JWS), Provider instance, or an instance of ProviderRequest, depending on what the application initialized.

The caller of ServiceRequestTransport and the implementation of ServiceResponseTransport are responsible for interacting with the physical transport. For example, the containing environment could receive requests in a servlet, MDB, or read them from a file and then pass them to the web services runtime through a ServiceRequestTransport.

The ProviderRequest implementation is responsible for executing the application request and this could include calling through to a client flow using DispatcherRequest (acting as an intermediary as is the case for OSB).

When the application response is available, the application is responsible for invoking the ProviderResponse, which was passed to the application when the original request to the ProviderRequest was made.

The invocation of ProviderResponse passes through the web services runtime and terminates with a call to one of the ServiceResponseTransport instances. In accordance with an embodiment, here the model is slightly different between client and service-side. In order to support non-anonymous addressing, the web services runtime can invoke on two different ServiceResponseTransports (shown here as 364 and 368). The first of these transports represents the request transport's anonymous ServiceResponseTransport (i.e., "anon", aka "backchannel"). In accordance with an embodiment, if the request's ReplyTo or FaultTo headers are set to ANON, then the anon ServiceResponseTransport is called after outbound service side SOAP processing. In this case, the non-anon ServiceResponseTransport is never called. If the request's ReplyTo or FaultTo headers are set to NON-ANON then, after outbound processing, the anon ServiceResponseTransport is called first with metadata only (i.e., no message). This gives the ability to close connections and send "OK" (e.g., HTTP 202) messages to the sender. Then the non-anon ServiceResponseTransport is called with the response message. Because the delivery address for the response message depends on the addressing headers, a non-anon message could be delivered on a different type of transport than the transport fronting the ServiceRequestTransport. For service containers that do need non-anon responses, the containing environment may pass null for the non-anon ServiceResponseTransport.

An example implementation that uses Oracle WebLogic, Oracle Web Services, and Oracle Service Bus may include the configuration shown below. Other environments and implementations which utilize different products may use different configurations:

ServiceRequestTransport: implemented by Web Services.
ProviderRequest: implemented by the containing environment (e.g., OSB).
ProviderResponse: implemented by Web Services and passed to the ProviderRequest at the time an inbound call is made.
ServiceRequestTransport (backchannel): implemented by the containing environment and passed to the ServiceRequestTransport at the time the original request was made.
ServiceRequestTransport (non-anonymous): implemented by the containing environment and passed to the ServiceRequestTransport at the time the original request was made.

In accordance with an embodiment, services may mix-and-match use of ServiceRequestTransport/ServiceResponseTransport with the use of ProviderRequest/ProviderResponse and the use of standard patterns. That is, services may use standard Providers (or SEI's) with ServiceRequestTransport/ServiceResponseTransport. Services may also use ProviderRequest/ProviderResponse with the built-in transports; however, this requires using pre-existing deployment models.

Service Life-Cycle

In accordance with an embodiment, DISI provides an Endpoint class that acts as a factory for ServiceRequestTransport instances. For example, OSB can pass their implementation of ProviderRequest during Endpoint initialization.

```
// Initialize customer-implemented ProviderRequest and create Endpoint
ProviderRequest providerRequest = new OSBProviderRequest( );
Endpoint e = EndpointFactory.factory( ).create(providerRequest, ...);
// Create ServiceRequestTransport
ServiceRequestTransport serviceRequestTransport =
e.createServiceRequestTransport(...);
// Making a call
ServiceResponseTransport backchannel = new OSBBackchannelSRT( );
ServiceResponseTransport nonanonchannel = new OSBNonAnonSRT( );
serviceRequestTransport.request(..., backchannel, nonanonchannel);
```

Figure 4:
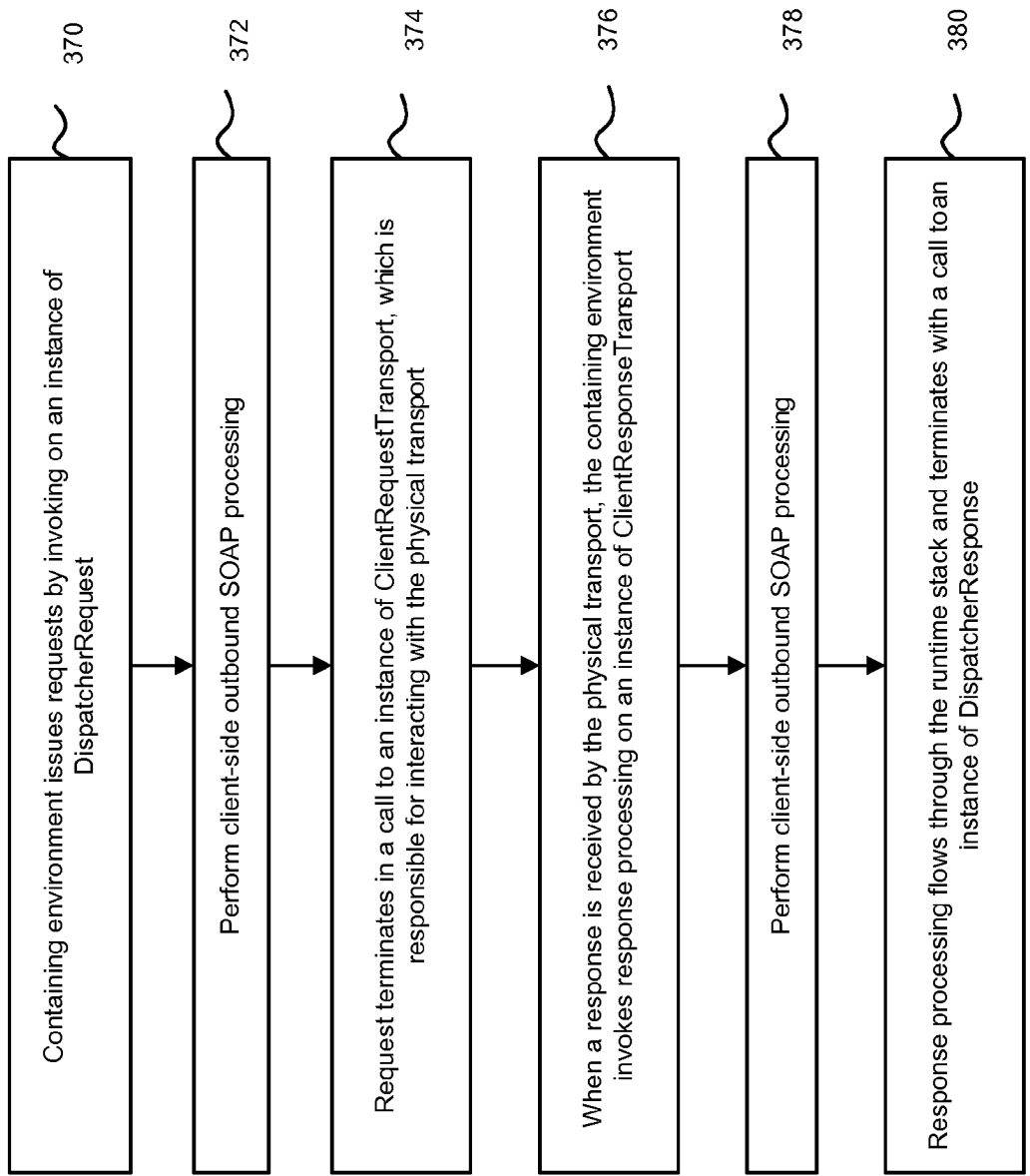
FIG. 4 is a flowchart of a method for providing a dynamic invocation and service interface (DISI) at the client-side, in accordance with an embodiment.
Figure 5:
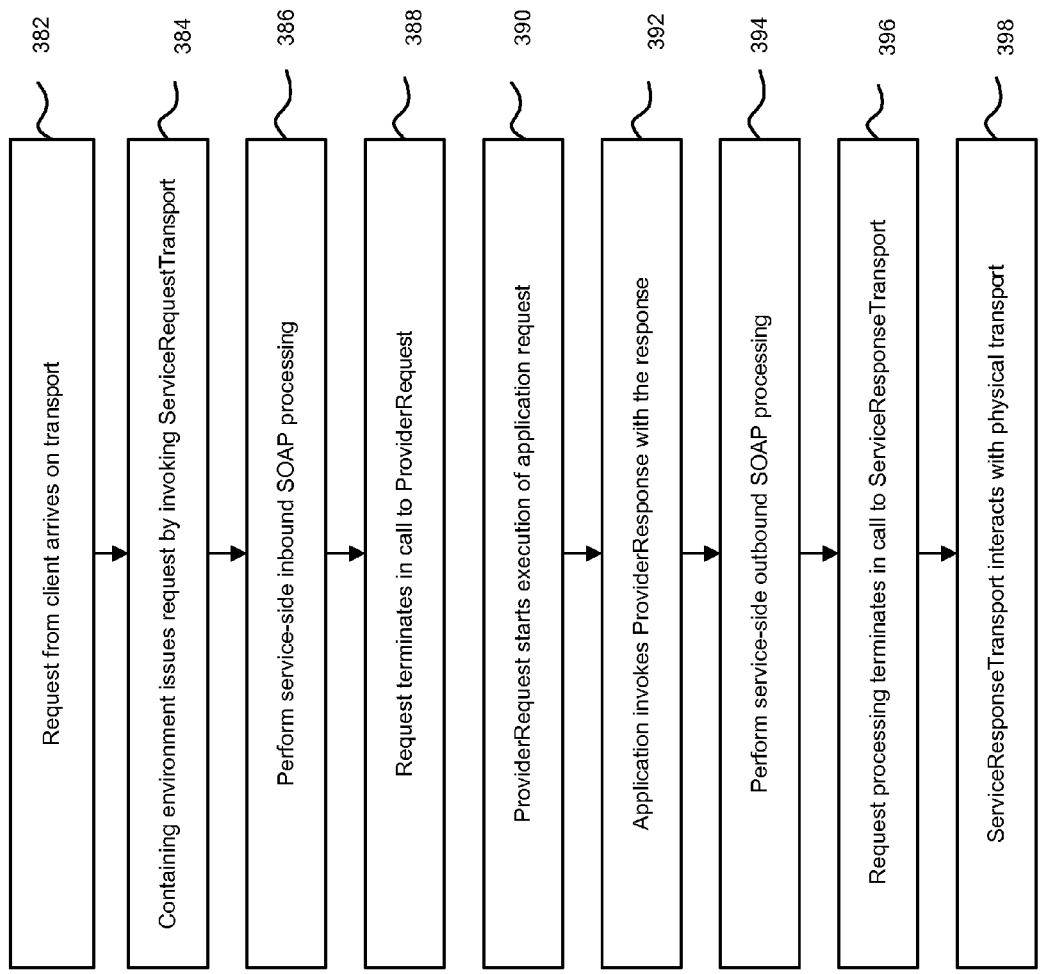
FIG. 5 is a flowchart of a method for providing a dynamic invocation and service interface (DISI) at the service-side, in accordance with an embodiment.

FIG. 4 and FIG. 5 are flowcharts of a method for providing a dynamic invocation and service interface (DISI), in accordance with an embodiment.

As shown in FIG. 4, at the client-side, at step 370, the containing environment issues requests by invoking on an instance of DispatcherRequest. At step 372, the runtime stack performs outbound SOAP processing. At step 374, the request terminates in a call to an instance of ClientRequestTransport, which is responsible for interacting with the physical transport. At step 376, when a response is received by the physical transport, the containing environment invokes response processing on an instance of ClientResponseTransport. At step 378, the runtime stack performs inbound SOAP processing. At step 380, the response processing flows through the runtime stack and terminates with a call to an instance of DispatcherResponse.

As shown in FIG. 5, at the service-side, at step 382, a request arrives on the transport. At step 384, the containing environment issues requests by invoking on ServiceRequestTransport. At step 386, the runtime performs service-side inbound SOAP processing. At step 388, the request terminates in a call to ProviderRequest. At step 390, ProviderRequest starts execution of the application request. At step 392, the application invokes ProviderResponse with the response. At step 394, the runtime performs service-side outbound SOAP processing. At step 396, the request processing terminates in a call to ServiceResponseTransport. At step 398, ServiceResponseTransport interacts with the physical transport.

Threading

In accordance with an embodiment, when the use-case does not involve buffering inside the SOAP runtime, the following properties hold:
- The thread that invokes ServiceRequestTransport will be the same thread that invokes ProviderRequest.
- The thread that invokes ProviderResponse will be the same thread that invokes non-anonymous ServiceResponseTransport, if there is a response.
- The backchannel ServiceResponseTransport will be called by either the thread that invoked ServiceRequestTransport or that invoked ProviderResponse, depending on whether the ReplyTo or FaultTo headers a anon or non-anon.
- One-way calls using WS-AT will not acknowledge the request (e.g., HTTP 202) until after the response is available.
- Otherwise, for one-way or non-anon ReplyTo or FaultTo, the web services runtime will invoke the backchannel as soon as possible.
- The thread that invokes DispatcherRequest will be the same thread that invokes ClientRequestTransport.
- The thread that invokes ClientResponseTransport will be the same thread that invokes DispatcherResponse.
- The thread that invokes ClientRequestTransport may invoke ClientResponseTransport, or a different thread may invoke ClientResponseTransport either before or after the thread that invokes ClientRequestTransport returns.
- The thread that invokes ProviderRequest may invoke Provider response, or a different thread may invoke ProviderResponse either before or after the thread that invokes ProviderRequest returns.

In accordance with an embodiment, with buffering enabled, request or response flows that must be buffered will terminate in the buffering sub-system and then, later, a thread of the buffering sub-system (e.g., work manager for an MDB) will complete the flow. In other words, all of the rules above, modified to add the buffering point, continue to hold without any other additions.

Metadata Access

In accordance with an embodiment, endpoints can make their metadata (i.e. both WSDL documents and XSD's) available to callers by indicating a metadata request in per-request metadata (known as "request context") that is part of the message. The request context can have properties such as the following:
TransportPropertySet.TRANSPORT_REQUEST_PRESENT_PROPERTY=false
TransportPropertySet.TRANSPORT_QUERY_PROPERTY=<some value>
TransportPropertySet.TRANSPORT_METADATA_BASEADDRESS_PROPERTY=<URL base address for metadata documents>

Persistence and Clustering

In accordance with an embodiment, DISI persistence and clustering can be based on the serialization of request/response context and ClientRequestTransport, ClientResponseTransport, DispatcherResponse, ProviderRequest, ProviderResponse and ServiceResponseTransport objects (serialization of ClientRequestTransport and ProviderRequest is only required if buffering is configured to occur during SOAP processing).

Use Cases

In accordance with an embodiment, the ProviderRequest implementation can serialize ProviderResponse object and any necessary arguments from the request. Later, when another process such as a batch process has completed, the ProviderResponse can be deserialized and invoked. The ProviderResponse may be deserialized and invoked from any machine in the same cluster as the machine where the original request occurred or after server restart.

In those implementations which use Web Services, the Web Services runtime can serialize the non-anonymous ServiceResponseTransport object so that it may later use this object to send non-anonymous responses. This could happen because of a buffering point (e.g., use of asynchronous Web Services Reliable Messaging, WS-RM) or because the ProviderResponse object was serialized. It is not expected that the backchannel ServiceResponseTransport object will ever be serialized, as transports that support a backchannel do not support persistence or clustering of the backchannel response.

In accordance with an embodiment, the ClientRequestTransport implementation can serialize ClientResponseTransport object, such that the ClientResponseTransport object could be invoked after server restart or on another machine in the cluster. This is one possible implementation of asynchronous response handling using non-anonymous addressing.

In those implementations which use Web Services, the Web Services runtime can serialize the DispatcherResponse object so that it may later invoke on this object to deliver the application response. This could happen because of a buffering point or because the ClientResponseTransport object was serialized. In accordance with an embodiment, DISI does not define a model to manage the lifecycle of serialized callback objects. Web Services buffering implementations can provide these capabilities for objects they store (e.g., WS-RM can delete persisted data, including serialized objects, related to expired or terminated conversations).

Configuration

In accordance with an embodiment, all configuration of DISI service endpoints and clients can be programmatic, using JAX-WS standard APIs, DISI APIs and DISI-specific WebServiceFeature classes (i.e., configuration beans). These APIs can include bean properties available on DISI's Service and Endpoint classes, which derive from the standard Service and Endpoint classes, respectively, as well as, standard WebServiceFeature classes such MTOMFeature and AddressingFeature. There are no standard WebServiceFeature classes for most WS-* features. Proprietary WebServiceFeature classes may be given to DISI if the underlying SOAP stack understands those classes. In accordance with an embodiment, DISI has an Endpoint.update API that containing environments can use to dynamically reconfigure a DISI-based endpoint (i.e., service-side). For example, OSB might use OWSM to manage a web service. When a change notification comes from OWSM then Endpoint.update would be called with the new configuration.

Request and Response Context

In accordance with an embodiment, context about DISI requests or responses (data other than the message) can be passed using instances of Map<String, Object> context objects. For ease-of-use, DISI provides an adapter class to populate the request and response context from standard servlet request and response objects, respectively: ServletContextAdapter.

ServiceRequestTransport

Table 1 describes request context key/value pairs for ServiceRequestTransportrequest( ), in accordance with an embodiment.

TABLE 1

| Key | Data Type | Default | Description |
| --- | --- | --- | --- |
| RequestHeadersPropertySet.REQUEST_HEADERS_PROPERTY | Map<String, List<String>> | null | Transport-level request headers. Map is from request header name to an ordered list of values |
| JavaEESecurityPropertySet.USER_PRINCIPAL_PROPERTY | Accessor<Principal> | null | User principal. Value is wrapped with Accessor as many technologies cannot provide the user principal until during request processing |
| JavaEESecurityPropertySet.ROLE_PROPERTY | RoleAccessor | null | User roles |
| TransportPropertySet.TRANSPORT_SECURE_PROPERTY | Boolean | false | Indicates that transport is secure, e.g., encrypted or confidential |
| TransportPropertySet.TRANSPORT_CLIENTCERTS_PROPERTY | X509Certificate | null | Client certificates delivered by the transport |
| TransportPropertySet.TRANSPORT_REQUEST_PRESENT_PROPERTY | Boolean | true | Indicates if there is a request present at the transport layer, e.g., use of HTTP GET method would be an example where this property is false |
| TransportPropertySet.TRANSPORT_RESPONSE_EXPECTED_PROPERTY | Boolean | true | Indicates if a response is expected by the transport layer, e.g., use of HTTP HEAD method would be an example where this property is false |
| TransportPropertySet.TRANSPORT_BASEADDRESS_PROPERTY | String | null | Base address from which endpoint mapping is relative. This value should be a valid URL when combined with the mapping for a given Endpoint or the query address for a WSDL or schema. The value should be in the context of the current client request |

TABLE 1-continued

| Key | Data Type | Default | Description |
|---|---|---|---|
| TransportPropertySet.TRANSPORT_METADATA_BASEADDRESS_PROPERTY | String | value of TRANSPORT_BASEADDRESS_PROPERTY property | Base address for metadata from which endpoint mapping is relative. This value should be a valid URL when combined with the mapping for a given Endpoint or the query address for a WSDL or schema. The value should be in the context of the current client request. One use case for this property is when transport policy requires confidentiality, but the WSDL may be accessed over clear channels. |
| TransportPropertySet.TRANSPORT_PATH_PROPERTY | String | null | Any extra path information associated with the URL the client sent when it made this request. This would be any path information following the Endpoint mapping address, but preceding any query string |
| TransportPropertySet.TRANSPORT_QUERY_PROPERTY | String | null | Query string portion of the URL used by the client when it made this request. |

ServiceResponseTransport

Table 2 describes response context key/value pairs for ServiceResponseTransport.response( ) and ServiceResponseTransport.fail( ), in accordance with an embodiment.

TABLE 2

| Key | Data Type | Default | Description |
|---|---|---|---|
| ResponseHeadersPropertySet.-RESPONSE_HEADERS_PROPERTY | Map<String, List<String>> | null | Transport-level response headers. Map is from response header name to an ordered list of values |
| ResponseMetadataPropertySet.-CONTENTTYPE_PROPERTY | String | null | Content type for response |
| ResponseMetadataPropertySet.-RESPONSE_AVAILABLE_PROPERTY | Boolean | false | Indicates that a response message or fault is available to send. When no response is available, this indicates that the transport should provide a status to the caller without a specific message (e.g., for HTTP this could be HTTP 202, 401, 403, 404, or 415, etc.) |
| ResponseMetadataPropertySet.-RESPONSE_ISFAULT_PROPERTY | Boolean | false | Indicates that the response is a fault or error condition. |
| ResponseMetadataPropertySet.-RESPONSE_ERRORSTATUS_PROPERTY | ResponseMetadataPropertySet.ErrorStatus | NOT_FOUND | Only used when response is not available and response is a fault (i.e. error condition). Indicates type of error |
| ResponseMetadataPropertySet.-RESPONSE_TARGETENDPOINT_PROPERTY | String | anonymous | Target endpoint address for non-anonymous response |

ProviderRequest

Table 3 describes request context key/value pairs for ProviderRequest.request( ), in accordance with an embodiment.

TABLE 3

| Key | Data Type | Default | Description |
|---|---|---|---|
| RequestMetadataPropertySet.-CONTENTTYPE_PROPERTY | String | null | Content type for request |
| RequestMetadataPropertySet.-REQUEST_SOAPACTION_PROPERTY | String | null | SOAP Action for request |

ProviderResponse

Table 4 describes request context key/value pairs for ProviderResponse.response( ), in accordance with an embodiment.

TABLE 4

| Key | Data Type | Default | Description |
|---|---|---|---|
| ResponseMetadataPropertySet.-CONTENTTYPE_PROPERTY | String | null | Content type for response |
| ResponseMetadataPropertySet.-RESPONSE_SOAPACTION_PROPERTY | String | null | SOAP Action for response |

DispatcherRequest

Table 5 describes request context key/value pairs for DispatcherRequest.request( ), in accordance with an embodiment.

TABLE 5

| Key | Data Type | Default | Description |
|---|---|---|---|
| RequestMetadataPropertySet.-CONTENTTYPE_PROPERTY | String | null | Content type for request |

TABLE 5-continued

| Key | Data Type | Default | Description |
| --- | --- | --- | --- |
| RequestMetadataPropertySet.-REQUEST_SOAPACTION_PROPERTY | String | null | SOAP Action for request |

DispatcherResponse

Table 6 describes request context key/value pairs for DispatcherResponse.response( ), in accordance with an embodiment.

TABLE 6

| Key | Data Type | Default | Description |
| --- | --- | --- | --- |
| ResponseMetadataPropertySet.-CONTENTTYPE_PROPERTY | String | null | Content type for response |
| ResponseMetadataPropertySet.-RESPONSE_SOAPACTION_PROPERTY | String | null | SOAP Action for response |

ClientRequestTransport

Table 7 describes request context key/value pairs for ClientRequestTransport.request( ), in accordance with an embodiment.

TABLE 7

| Key | Data Type | Default | Description |
| --- | --- | --- | --- |
| RequestMetadataPropertySet.-CONTENTTYPE_PROPERTY | String | null | Content type for request |
| RequestMetadataPropertySet.-REQUEST_SOAPACTION_PROPERTY | String | null | SOAP Action for request |

ClientResponseTransport

Table 8 describes request context key/value pairs for ClientResponseTransport.response( ), in accordance with an embodiment.

TABLE 8

| Key | Data Type | Default | Description |
| --- | --- | --- | --- |
| ResponseMetadataPropertySet.-CONTENTTYPE_PROPERTY | String | null | Content type for response |
| ResponseMetadataPropertySet.-RESPONSE_SOAPACTION_PROPERTY | String | null | SOAP Action for response |

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for providing a dynamic invocation and service interface for use in a middleware or other environment, the system comprising:
   a client-side environment comprising a client computer, a client container, and a client application;
   a service-side environment comprising a service provider computer, a service provider container, and a service; and
   an interface operable at the client-side environment and the service-side environment,
   wherein at the client-side environment,
      a dispatcher request function is provided which enables messages to be placed by the client application in a runtime stack for client-side message processing, and a dispatcher response function is provided which enables the messages to be received by the client application from the runtime stack after the client-side message processing, wherein the dispatcher request and response functions are asynchronous, a client request transport function and a client response transport function are provided for providing a transport of the messages relative to the client-side environment and which decouple the client-side message processing from the transport, wherein at the service-side environment, a service request transport function and a service response transport function are provided for providing a transport of the messages relative to the service-side environment and which decouple service-side message processing from transport of the messages relative to the service-side environment, and a provider request function is provided which enables the messages to be received via the runtime stack and processed by the service, and a provider response function is provided which enables response messages to be placed by the service in the runtime stack for processing, wherein the provider request and response functions are asynchronous.

2. The system of claim 1, wherein each request function has a corresponding callback function at the client-side and the service-side, which makes the message processing asynchronous.

3. The system of claim 1, wherein
the service is a web service,
the service provider container is a web service container, and
the client application is a web service client.

4. The system of claim 1, wherein
at an outbound of the client-side environment,
the client application makes a request upon a target service by calling the dispatcher request function,
the request is processed by the outbound client-side SOAP stack,
the SOAP stack calls a client request transport function, and
the client request transport function in the client container communicates the request to the transport;
at an inbound of the service-side environment,
the service request transport function receives the request from the transport,
the service request transport function communicates the request to the inbound SOAP stack for processing, and
the SOAP stack calls a provider request function for processing by the service;
at an outbound of the service-side environment,
when the service is ready to provide a response, it calls a provider response function to communicate the response to the outbound service-side SOAP stack for processing,
the SOAP stack calls the service response transport function, and
the service response transport function communicates the response to the transport; and
at an inbound of the client-side environment,
the client container receives the response from the transport,
the client container calls client response transport function to communicate the response to the inbound client-side SOAP stack, and
after SOAP processing, the SOAP stack communicates the request to the dispatcher response function for delivery to the client application.

5. The system of claim 4, wherein two different service response transport functions can be provided and selectively invoked upon for communicating the response to the client application depending on response addresses contained in request headers, and wherein
at the client-side environment,
a dispatcher request function is provided to enable messages to asynchronously be placed by the client application in an outbound runtime protocol stack for processing, and
a dispatcher response function is provided to enable responses to be asynchronously received from the inbound protocol stack after processing, and
a client request transport function and a client response transport function are provided that decouple message processing from the transport, and enable asynchronous handling of messages; and
at the service-side environment,
a service request transport function and a service response transport function are provided, which asynchronous decouple the messaging processing from the transport, and enable messages to be received via the runtime stack and processed by the protocol stack,
a provider request function is provided, which asynchronously receive request messages after inbound processing by the protocol stack, and
a provider response function is provided, which asynchronously enables a service response to be placed in the runtime protocol stack for outbound processing.

6. A method for providing a messaging application programming interface (API) for use in a middleware or other environment, the method comprising the steps of:
providing, at a client-side environment which comprises a client computer, a client container and a client application;
providing, at a service-side environment which comprises a service provider computer, a service provider container and a service; and
providing a dynamic invocation and service interface operable at the client-side environment and the service-side environment,
wherein at the client-side environment,
a dispatcher request function is provided which enables messages to be placed by the client application in a runtime stack for client-side message processing, and a dispatcher response function is provided which enables the messages to be received by the client application from the runtime stack after the client-side message processing, wherein the dispatcher request and response functions are asynchronous,
a client request transport function and a client response transport function are provided for providing a transport of the messages relative to the client-side environment and which decouple the client-side message processing from the transport,
wherein at the service-side environment,
a service request transport function and a service response transport function are provided for providing a transport of the messages relative to the service-side environment and which decouple service-side message processing from transport of the messages relative to the service-side environment, and
a provider request function is provided which enables the messages to be received via the runtime stack and processed by the service, and a provider response function is provided which enables response messages to be placed by the service in the runtime stack for processing, wherein the provider request and response functions are asynchronous.

7. The method of claim 6, wherein each request function has a corresponding callback function at the client-side and the service-side, which makes the message processing asynchronous.

8. The method of claim 6, wherein
the service is a web service,
the service provider container is a web service container, and
the client application is a web service client.

9. The method of claim 6, wherein
at an outbound of the client-side environment,
the client application makes a request upon a target service by calling the dispatcher request function,
the request is processed by the outbound client-side SOAP stack,
the SOAP stack calls a client request transport function, and
the client request transport function in the client container communicates the request to the transport;
at an inbound of the service-side environment,
the service request transport function receives the request from the transport,
the service request transport function communicates the request to the inbound SOAP stack for processing, and
the SOAP stack calls a provider request function for processing by the service;
at an outbound of the service-side environment,
when the service is ready to provide a response, it calls a provider response function to communicate the response to the outbound service-side SOAP stack for processing,
the SOAP stack calls the service response transport function, and
the service response transport function communicates the response to the transport; and
at an inbound of the client-side environment,
the client container receives the response from the transport,
the client container calls client response transport function to communicate the response to the inbound client-side SOAP stack, and
after SOAP processing, the SOAP stack communicates the request to the dispatcher response function for delivery to the client application.

10. The method of claim 9, wherein two different service response transport functions can be provided and selectively invoked upon for communicating the response to the client application depending on response addresses contained in request headers, and wherein
at the client-side environment,
a dispatcher request function is provided to enable messages to asynchronously be placed by the client application in an outbound runtime protocol stack for processing,
and a dispatcher response function is provided to enable responses to be asynchronously received from the inbound protocol stack after processing, and
a client request transport function and a client response transport function are provided that decouple message processing from the transport, and enable asynchronous handling of messages; and
at the service-side environment,
a service request transport function and a service response transport function are provided, which asynchronous decouple the messaging processing from the transport, and enable messages to be received via the runtime stack and processed by the protocol stack,
a provider request function is provided, which asynchronously receive request messages after inbound processing by the protocol stack, and
a provider response function is provided, which asynchronously enables a service response to be placed in the runtime protocol stack for outbound processing.

11. A non-transitory computer readable storage medium, including instructions stored thereon, which when read and executed by one or more computers, cause the one or more computers to perform the steps comprising:
providing, at a client-side environment which comprises a client computer, a client container and a client application;
providing, at a service-side environment which comprises a service provider computer, a service provider container and a service; and
providing a dynamic invocation and service interface operable at the client-side environment and the service-side environment,
wherein at the client-side environment,
a dispatcher request function is provided which enables messages to be placed by the client application in a runtime stack for client-side message processing, and a dispatcher response function is provided which enables the messages to be received by the client application from the runtime stack after the client-side message processing, wherein the dispatcher request and response functions are asynchronous,
a client request transport function and a client response transport function are provided for providing a transport of the messages relative to the client-side environment and which decouple the client-side message processing from the transport,
wherein at the service-side environment,
a service request transport function and a service response transport function are provided for providing a transport of the messages relative of the service-side environment and which decouple service-side message processing from transport of the messages relative to the service-side environment, and
a provider request function is provided which enables the messages to be received via the runtime stack and processed by the service, and a provider response function is provided which enables response messages to be placed by the service in the runtime stack for processing, wherein the provider request and response functions are asynchronous.

12. The non-transitory computer readable storage medium of claim 11, wherein each request function has a corresponding callback function at the client-side and the service-side, which makes the message processing asynchronous.

13. The non-transitory computer readable storage medium of claim 11, wherein
the service is a web service,
the service provider container is a web service container, and
the client application is a web service client.

14. The non-transitory computer readable storage medium of claim 11, wherein
at an outbound of the client-side environment,
the client application makes a request upon a target service by calling the dispatcher request function,
the request is processed by the outbound client-side SOAP stack, the SOAP stack calls a client request transport function, and the client request transport function in the client container communicates the request to the transport;

at an inbound of the service-side environment, the service request transport function receives the request from the transport, the service request transport function communicates the request to the inbound SOAP stack for processing, and the SOAP stack calls a provider request function for processing by the service;

at an outbound of the service-side environment, when the service is ready to provide a response, it calls a provider response function to communicate the response to the outbound service-side SOAP stack for processing, the SOAP stack calls the service response transport function, and the service response transport function communicates the response to the transport; and at an inbound of the client-side environment, the client container receives the response from the transport, the client container calls client response transport function to communicate the response to the inbound client-side SOAP stack, and after SOAP processing, the SOAP stack communicates the request to the dispatcher response function for delivery to the client application.

15. The non-transitory computer readable storage medium of claim 14, wherein two different service response transport functions can be provided and selectively invoked upon for communicating the response to the client application depending on response addresses contained in request headers, and wherein at the client-side environment, a dispatcher request function is provided which enables messages to be placed by the client application in the runtime stack for processing, and a dispatcher response function is provided which enables messages to be received by the client application from the runtime stack after processing, and a client request transport function and a client response transport function are provided that decouple message processing from the transport, and enable asynchronous handling of messages; and at the service-side environment, a service request transport function and a service response transport function are provided, which asynchronous decouple the messaging processing from the transport, and enable messages to be received via the runtime stack and processed by the protocol stack, and a provider request function is provided which enables messages to be received via the runtime stack and processed by the service, and a provider response function is provided which enables response messages to be placed by the service in the runtime stack for processing.

* * * * *